(12) United States Patent
Kinoshita

(10) Patent No.: US 9,906,074 B2
(45) Date of Patent: Feb. 27, 2018

(54) POWER SUPPLY SYSTEM

(75) Inventor: Masahiro Kinoshita, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 298 days.

(21) Appl. No.: 14/237,047

(22) PCT Filed: Sep. 13, 2011

(86) PCT No.: PCT/JP2011/070826
§ 371 (c)(1),
(2), (4) Date: Feb. 4, 2014

(87) PCT Pub. No.: WO2013/038496
PCT Pub. Date: Mar. 21, 2013

(65) Prior Publication Data
US 2014/0167517 A1    Jun. 19, 2014

(51) Int. Cl.
*H02J 9/00*    (2006.01)
*H02J 9/06*    (2006.01)

(52) U.S. Cl.
CPC ......... *H02J 9/062* (2013.01); *H02J 2009/068* (2013.01); *Y10T 307/735* (2015.04)

(58) Field of Classification Search
CPC ................................ H02J 9/061; H02J 9/062
USPC ................................................ 307/64–66, 87
See application file for complete search history.

(56) References Cited

U.S. PATENT DOCUMENTS

| 4,827,151 | A  | * | 5/1989 | Okado | H02J 9/062 |
|           |    |   |        |       | 307/66     |
| 6,700,351 | B2 | * | 3/2004 | Blair | H02J 7/0022|
|           |    |   |        |       | 320/125    |
| 2003/0048006 | A1 | * | 3/2003 | Shelter, Jr. | H02J 9/061 |
|           |    |   |        |       | 307/64     |
| 2008/0252144 | A1 | * | 10/2008 | Wang | H02J 9/062 |
|           |    |   |        |       | 307/66     |
| 2008/0265680 | A1 | * | 10/2008 | Marwali | H02J 9/062 |
|           |    |   |        |       | 307/65     |

(Continued)

FOREIGN PATENT DOCUMENTS

| JP | 57-46416 A | 3/1982 |
| JP | 8-256431   | 10/1996 |

(Continued)

OTHER PUBLICATIONS

Power Protection to the Max Using Synchronized Systems; http://www.ecmweb.com/power-quality-archive/power-protection-max-using-synchronized-systems; May 1, 2001; pp. 1-17 (in particular pp. 1-2).*

(Continued)

*Primary Examiner* — Alfonso Perez Borroto
(74) *Attorney, Agent, or Firm* — Oblon, McClelland, Maier & Neustadt, L.L.P.

(57) ABSTRACT

A power supply system includes an uninterruptable power-supply apparatus supplying power to a load, a switch connecting a bypass power supply to the load, and a switching circuit turning the switch on when the uninterruptable power-supply apparatus is stopped. In a case where the uninterruptable power-supply apparatus is stopped, the switching circuit turns the switch on when a phase of an output voltage of the bypass power supply is equal to a phase of an output voltage of the uninterruptable power-supply apparatus at a stopped timing.

3 Claims, 5 Drawing Sheets

(56) References Cited

U.S. PATENT DOCUMENTS

| 2009/0184583 A1* | 7/2009 | Lu | H02J 9/062 307/66 |
|---|---|---|---|
| 2009/0251005 A1* | 10/2009 | Bush | H02J 9/06 307/64 |
| 2012/0181871 A1* | 7/2012 | Johansen | H02J 9/062 307/66 |

FOREIGN PATENT DOCUMENTS

| JP | 9-130995 A | 5/1997 |
| JP | 10-164754 A | 6/1998 |
| JP | 2002-17055 A | 1/2002 |
| JP | 2005-328656 | 11/2005 |
| JP | 2009-171771 | 7/2009 |
| JP | 2009-225546 | 10/2009 |
| JP | 2011-97676 | 5/2011 |

OTHER PUBLICATIONS

International Search Report dated Dec. 6, 2011 in PCT/JP2011/070826 filed Sep. 13, 2011.
Office Action dated Feb. 16, 2015 in Korean Patent Application No. 10-2014-7003376 (with English translation).
Korean Office Action dated Jul. 1, 2016 in Patent Application No. 10-2015-7033277 (with English translation).
Korean Office Action dated Jan. 26, 2017 in Patent Application No. 10-2015-7033277 (with English translation).
Japanese Office Action dated Mar. 7, 2017 in Patent Application No. 2013-533376 (with English translation).

* cited by examiner

POWER SUPPLY SYSTEM

TECHNICAL FIELD

The present invention relates to a power supply system, and particularly to a power supply switching circuit used for an uninterruptable power-supply system (UPS).

BACKGROUND ART

An uninterruptable power-supply system (UPS) is configured to supply power continuously to a load. The UPS is stopped in some cases due to failure or maintenance of the UPS. To prepare for such cases, a bypass power supply is provided in parallel with the UPS.

A UPS generally includes an inverter. When the inverter fails, the bypass power supply provides power to a load. When the voltage of the bypass power supply is not in synchronization with the output voltage of the UPS, a large magnetizing inrush current disadvantageously flows into a load transformer.

When the bypass power supply provides power to the load, an output switch of the UPS is turned off. However, a certain amount of time is required to completely turn the output switch off. Therefore, there is a possibility that the magnetizing inrush current flows not only into the load transformer but also into an isolation transformer provided in the UPS.

Japanese Patent Laying-Open No. 8-256431 (PTD 1) discloses a static inrush current suppressing device for suppressing a transformer magnetizing inrush current. This device includes a thyristor connected to a primary side of a transformer, an instrument transformer connected to a primary side of the thyristor, a peak voltage detecting circuit connected to a secondary side of the instrument transformer, and a thyristor gate output circuit turning the thyristor on at a timing when the peak voltage detecting circuit detects a peak voltage. The transformer is magnetized by the peak voltage. Accordingly, the transformer magnetizing inrush current can be suppressed.

CITATION LIST

Patent Document

PTD 1: Japanese Patent Laying-Open No. 8-256431

SUMMARY OF INVENTION

Technical Problem

To provide power to a load without interruption even when a UPS is stopped, shortening a time for switching a power supply is required. Further, synchronizing a voltage of a bypass power supply with an output voltage of the UPS is also required.

An object of the present invention is to provide a power supply system capable of shortening a switching time of a power supply as well as suppressing a magnetizing inrush current.

Solution to Problem

A power supply system according to one aspect of the present invention includes an uninterruptable power-supply apparatus supplying power to a load, a switch connecting a bypass power supply to the load, and a switching circuit turning the switch on when the uninterruptable power-supply apparatus is stopped. In a case where the uninterruptable power-supply apparatus is stopped, the switching circuit turns the switch on when a phase of an output voltage of the bypass power supply is equal to a phase of an output voltage of the uninterruptable power-supply apparatus at a stopped timing.

Advantageous Effects of Invention

According to the present invention, a time for switching power supplies between an uninterruptable power-supply system and a bypass power supply can be shortened. Further, according to the present invention, a magnetizing inrush current can be suppressed.

DESCRIPTION OF EMBODIMENTS

Figure 1:
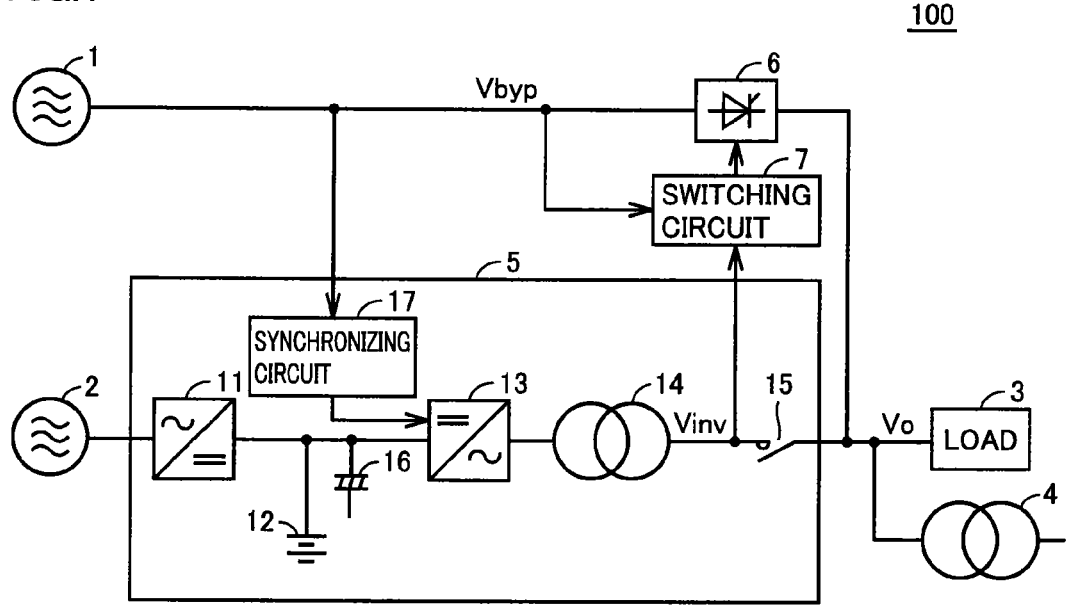
FIG. 1 represents a configuration of a power supply system according to one embodiment of the present invention.

Hereinafter, embodiments of the present invention will be described with reference to the drawings. The same or corresponding parts in the drawings have the same reference numerals allotted, and description thereof will not be repeated.

FIG. 1 represents a configuration of a power supply system according to one embodiment of the present invention. Referring to FIG. 1, a power supply system 100 supplies power, which is provided by a bypass power supply 1 or an input power supply 2, to a load 3. Bypass power supply 1 and input power supply 2 are alternate-current power supplies. In FIG. 1, bypass power supply 1 and input power supply 2 are illustrated as three-phase alternate-current power supplies. However, these power supplies may be single-phase power supplies. Types of bypass power supply 1 and input power supply 2 are not particularly limited.

Power supply system 100 includes an uninterruptable power-supply apparatus (UPS) 5, a thyristor switch 6, and a switching circuit 7. UPS 5 includes a converter 11, a battery 12, an inverter 13, an isolation transformer 14, an output switch 15, a capacitor 16, and a synchronizing circuit 17. Load transformer 4 is provided in parallel with load 3.

Converter 11 converts alternate-current power from input power supply 2 into direct-current power. The direct-current power from converter 11 is supplied to battery 12 and inverter 13. During operation of converter 11, battery 12 stores the direct-current power from converter 11. When converter 11 is stopped, battery 12 supplies direct-current power to inverter 13. Capacitor 16 smoothes the direct-current power inputted to inverter 13.

Inverter 13 converts direct-current power into alternate-current power (for example, three-phase alternate-current). Output switch 15 switches whether or not to output the alternate-current power from inverter 13 to load 3. For example, output switch 15 is achieved by a mechanical switch (for example, contactor). In a case where output switch 15 is in the on-state, the alternate-current power from inverter 13 is supplied to load 3 and load transformer 4 via isolation transformer 14. In this case, thyristor switch 6 is in the off-state.

Synchronizing circuit 17 synchronizes a phase of a voltage Vinv with a phase of a voltage Vbyp. Voltage Vinv is a voltage outputted from inverter 13 via isolation transformer 14. Voltage Vbyp is an output voltage of bypass power supply 1. For example, synchronizing circuit 17 is achieved by a PLL (Phase Lock Loop) circuit. In the case where output switch 15 is in the on-state, a voltage Vo inputted to load 3 and load transformer 4 is equal to voltage Vinv.

Switching circuit 7 monitors voltage Vinv. For example, in the case where the supply of voltage Vinv is stopped due to failure of inverter 13, switching circuit 7 turns thyristor switch 6 on. Further, output switch 15 is turned off. For example, switching circuit 7 turns output switch 15 off. Another circuit may turn output switch 15 off.

When thyristor switch 6 is turned on, bypass power supply 1 is connected to load 3 and load transformer 4. Therefore, power from bypass power supply 1 is supplied to load 3 and load transformer 4. In this case, voltage Vo is equal to voltage Vbyp.

According to one embodiment of the present invention, switching circuit 7 stores a phase of voltage Vinv which is exhibited at a timing when UPS 5 stops the supply of power to load 3. Further, switching circuit 7 monitors voltage Vbyp. Switching circuit 7 turns thyristor switch 6 on when the phase of voltage Vbyp matches with the stored phase of voltage Vinv.

According to this embodiment, a length of a period during which the supply of power to load 3 is stopped can be set within one cycle of an alternate current (for example, 1/50 seconds or 1/60 seconds). In other words, according to this embodiment, a period of during which the supply of power to load 3 is stopped can be shortened.

Further, according to this embodiment, the phase of voltage Vo can be maintained when voltage Vo is switched from voltage Vinv to voltage Vbyp. Therefore, before and after voltage Vo is switched from voltage Vinv to voltage Vbyp, the phase of voltage Vo is changed continuously. Accordingly, the magnetizing inrush current flowing into load 3 and load transformer 4 can be suppressed.

Figure 2:
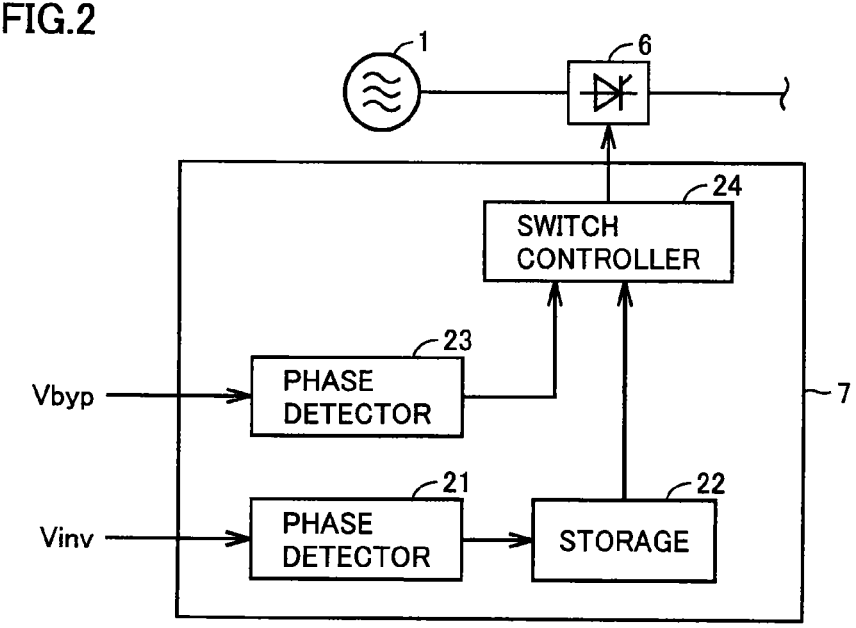
FIG. 2 is a functional block diagram representing a switching circuit shown in FIG. 1.

FIG. 2 is a functional block diagram representing the switching circuit shown in FIG. 1. Referring to FIG. 2, switching circuit 7 includes phase detectors 21, 23, a storage 22, and a switch controller 24.

Phase detector 21 detects the phase of voltage Vinv of UPS 5. For example, phase detector 21 measures a value of voltage Vinv to detect the phase of voltage Vinv. Specifically, an amplitude and a cycle of voltage Vinv are acquired, so that the phase of voltage Vinv can be determined based on a voltage value of voltage Vinv. The amplitude and cycle of voltage Vinv may be given to phase detector 21 in advance, or may be acquired by phase detector 21 during operation of UPS 5.

Storage 22 stores the phase of voltage Vinv at the stopped timing of UPS 5. For example, in the case where the phase of voltage Vinv does not change, phase detector 21 stores a value of the phase in storage 22. Alternatively, phase detector 21 may update the value stored in storage 22 with a detection value of the phase of voltage Vinv. In the case where the phase of voltage Vinv does not change, the value stored in storage 22 does not change. Therefore, storage 22 can store the phase of voltage Vinv at the stopped timing of UPS 5.

Phase detector 23 detects a phase of voltage Vbyp of bypass power supply 1. For example, phase detector 23 uses the same method as the detection method of phase detector 21 to detect the phase of voltage Vbyp.

Switch controller 24 compares the phase of Vinv stored in storage 22 with the phase of voltage Vbyp. In the case where the phase of voltage Vbyp matches with the phase of voltage Vinv, switch controller 24 turns thyristor switch 6 on.

In the case where UPS 5 is recovered, thyristor switch 6 is turned off. A control method for turning thyristor switch 6 off is not particularly limited. According to one embodiment, in the case where the phase of Vinv detected by phase detector 21 changes temporally, and the phase matches with the phase of voltage Vbyp, switch controller 24 turns thyristor switch 6 off. Switch controller 24 may further turn output switch 15 on. With such a control, the phase of voltage Vo supplied to load 3 and load transformer 4 can be made continuous.

Switch controller 24 can acquire the value stored in storage 22 periodically to determine if UPS 5 is operated or stopped. As described above, phase detector 21 uses the detection value of the phase of voltage Vinv to update the value stored in storage 22. Switch controller 24 can determine that UPS 5 is stopped in accordance with no change in the value stored in storage 22.

On the other hand, switch controller 24 can determine that UPS 5 is operated in accordance with a change in the value stored in storage 22. In this case, switch controller 24 does not turn thyristor switch 6 on. A control for turning thyristor switch 6 off can be achieved in accordance with the method described above. According to one embodiment, switch controller 24 turns thyristor switch 6 off in the case where the phase of voltage Vinv matches with the phase of voltage Vbyp.

Figure 3:
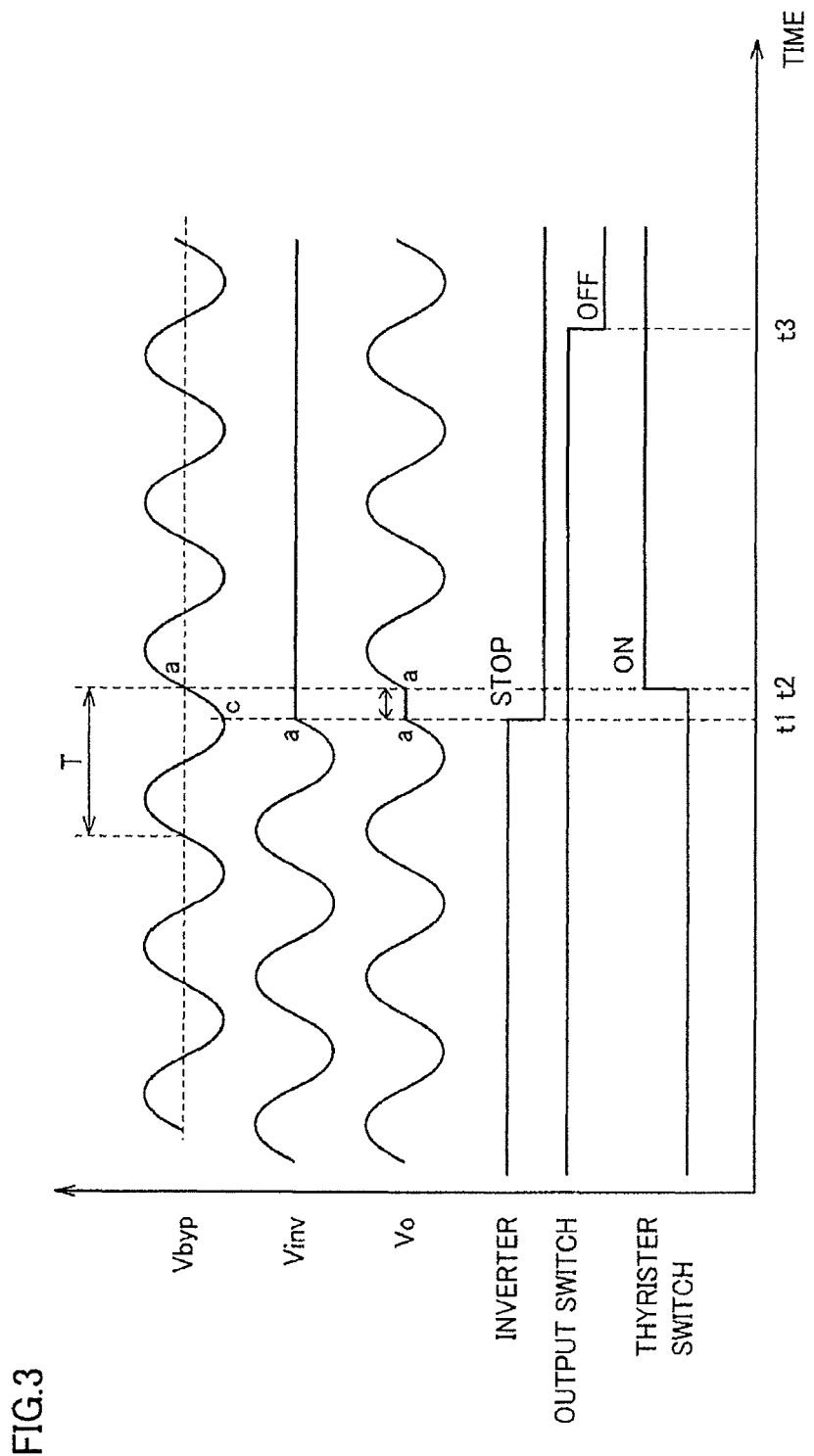
FIG. 3 represents waveforms for describing operation of the power supply system according to one embodiment of the present invention.

FIG. 3 represents waveforms for describing operation of the power supply system according to one embodiment of the present invention. Referring to FIGS. 1 and 3, inverter 13 is stopped at a time t1. The phase of voltage Vinv and the phase of voltage Vo are "a." On the other hand, the phase of voltage Vbyp at time t1 is "c." The phase "c" and the phase "a" are different.

The phase of voltage Vbyp is equal to "a" at a time t2. Therefore, switching circuit 7 turns thyristor switch 6 on. The supply of power to load 3 and load transformer 4 is restarted from time t2. The period from time t1 to time t2 is a period within one cycle T. After a lapse of a certain time (for example, 50 ms) from time t1, output switch 15 is turned off completely (time t3). However, according to the present embodiment, the supply of power to the load is recovered before time t3.

Figure 4:
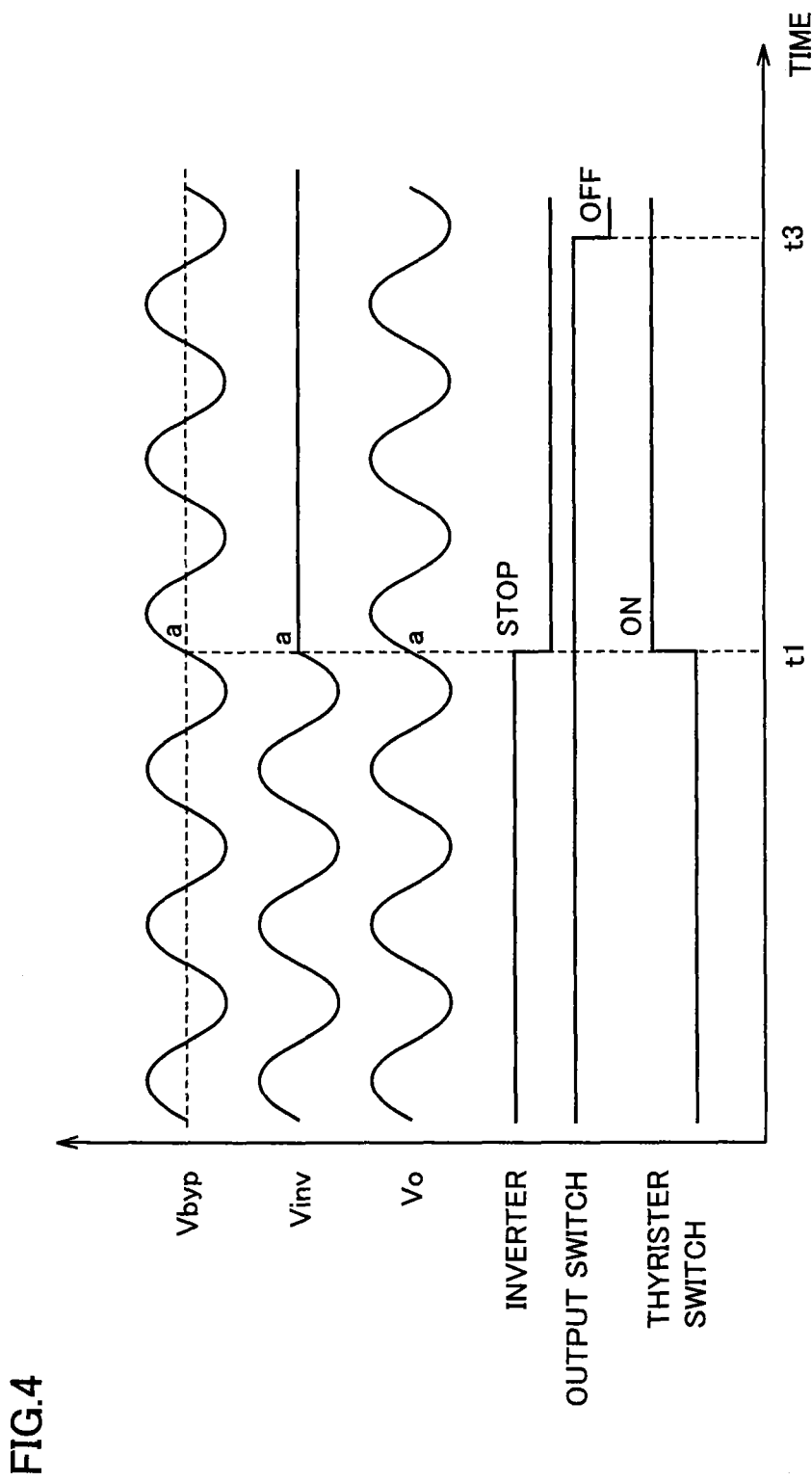
FIG. 4 represents waveforms for describing another operation of the power supply system according to one embodiment of the present invention.

FIG. 4 represents waveforms for describing another operation of the power supply system according to one embodiment of the present invention. Referring to FIG. 4, times t1, t3 correspond respectively to times t1, t3 shown in FIG. 3. In the embodiment shown in FIG. 4, voltage Vbyp and voltage Vinv are synchronized. In other words, the phase of voltage Vbyp and the phase of voltage Vinv are equal to each other.

According to FIG. 4, thyristor switch 6 can be turned on substantially at the same timing with the timing at which inverter 13 is stopped. Therefore, the period during which the supply of power to load 3 (and load transformer 4) is stopped can be further shortened.

Figure 5:
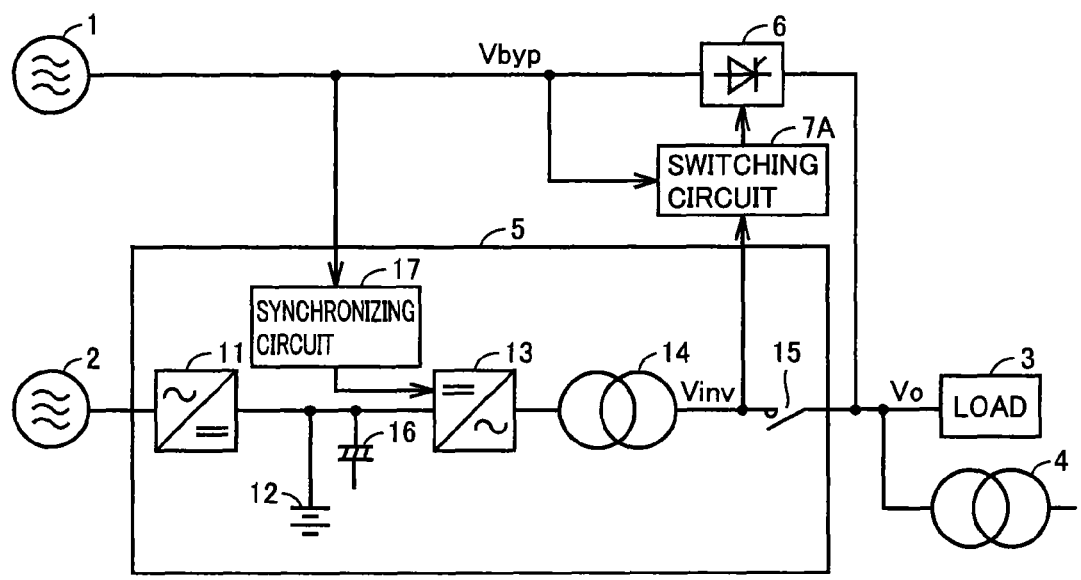
FIG. 5 represents a configuration of a comparative example of the power supply system according to the embodiment of the present invention.

FIG. 5 represents a configuration of a comparative example of the power supply system according to the present embodiment. Referring to FIGS. 1 and 5, a power supply system 101 is different from power supply system 100 in including a switching circuit 7A in place of switching circuit 7. Since the configuration of other parts of power supply system 101 are similar to the configuration of corresponding parts of power supply system 100, subsequent description will not be repeated.

In the case where UPS 5 is stopped, switching circuit 7A turns thyristor switch 6 on. Specifically, switching circuit 7A turns thyristor switch 6 on after a lapse of a certain time from turning output switch 15 off completely.

In the case where a frequency of bypass power supply 1 is changed, voltage Vinv cannot be synchronized with voltage Vbyp immediately. In the case where voltage Vinv cannot be synchronized with voltage Vbyp, inverter 113 is operated with a fixed free-running frequency.

Figure 6:
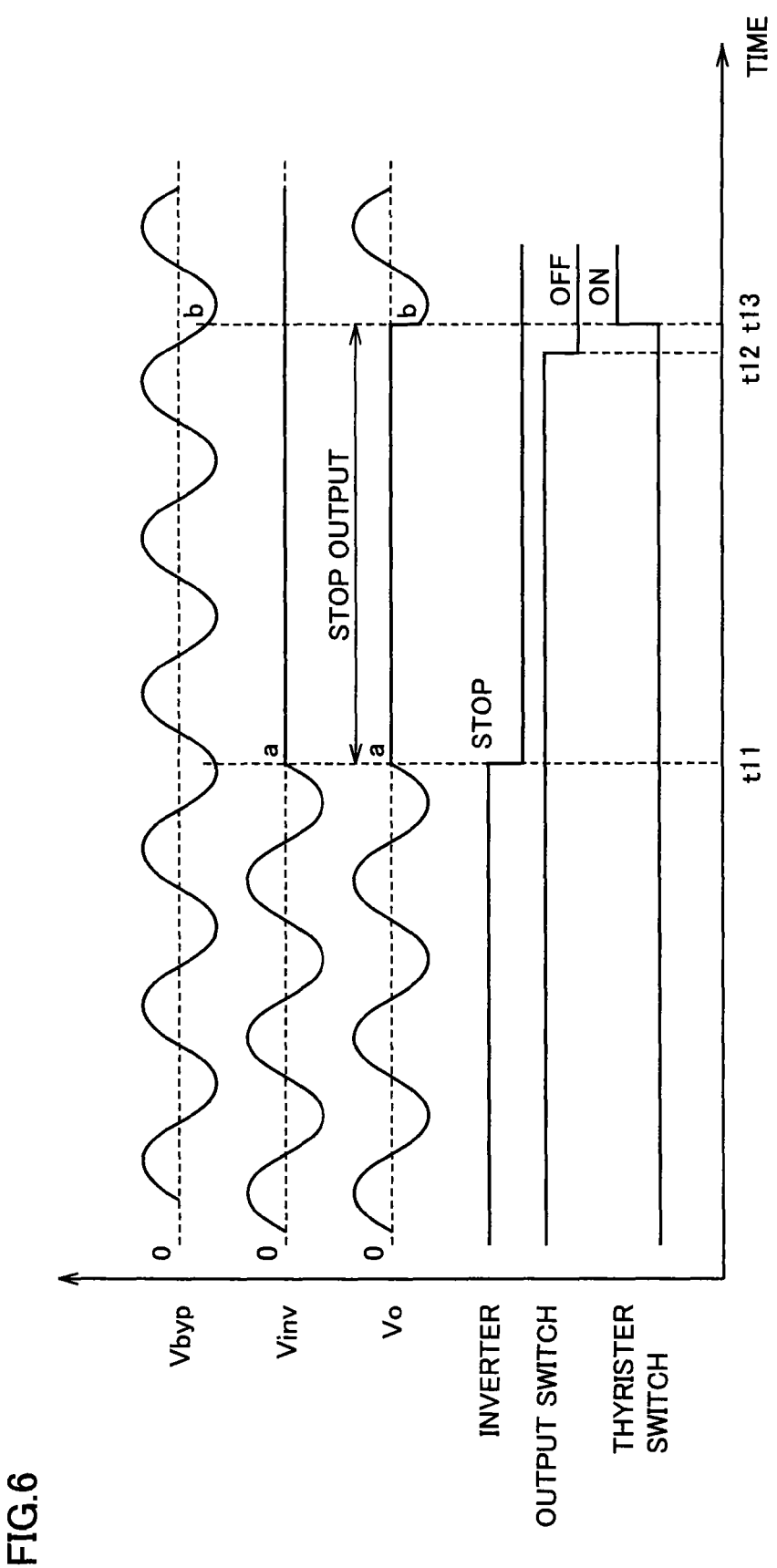
FIG. 6 represents waveforms for describing operation of the power supply system shown in FIG. 5.

FIG. 6 represents waveforms for describing operation of the power supply system shown in FIG. 5. Referring to FIGS. 5 and 6, the phase of voltage Vinv and the phase of voltage Vbyp are shifted each other. In the case where UPS 5 is stopped in this state, not only switching the power supply from input power supply 2 to bypass power supply 1 but also suppressing the magnetizing inrush current with respect to isolation transformer 114 is required. Therefore, according to the configuration shown in FIG. 5, thyristor switch 6 is turned on after output switch 15 is turned off.

Inverter 13 is stopped at time tn. As described above, a certain time is required to completely turn output switch 15 off after inverter 13 is stopped. Output switch 15 is completely turned off at time t12.

Thyristor switch 6 turns on after a lapse of a fixed delay time from turning output switch 15 off completely (time t13). From time t11 to time t13, the supply of power to load 3 is halted (Vo=0). Therefore, there is a possibility that operation of load 3 is stopped.

The phase of voltage Vo at time t11 is equal to phase "a" of voltage Vinv. On the other hand, the phase of voltage Vo at time t13 is equal to phase "b" of voltage Vbyp. Phase "b" is different from phase "a." Since the phase is changed discontinuously, a large magnetizing inrush current disadvantageously flows into load transformer 4.

On the other hand, as shown in FIGS. 3 and 4, according to the embodiment of the present invention, the period during which the supply of power to the load is stopped is a period within one cycle of an alternate current. Therefore, a possibility that the load is stopped becomes small.

Further, according to the present embodiment, the supply of power to load 3 can be restarted while maintaining the state of phase exhibited at the stopped timing of the supply of power to load 3. Accordingly, the magnetizing inrush current to load 3 and load transformer 4 can be suppressed.

The present invention can be applied to the configuration that the bypass power supply provides power to the load when the UPS is stopped. Therefore, the cause of the stoppage of the UPS is not limited to failure of the UPS, and it may include maintenance of the UPS.

It is to be understood that the embodiments disclosed herein are only way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 1 bypass power supply; 2 input power supply; 3 load; 4 load transformer; 5 uninterruptable power-supply apparatus; 6 thyristor switch; 7, 7A switching circuit; 11 converter; 12 battery; 13 inverter; 14 isolation transformer; 15 output switch; 16 capacitor; 17 synchronizing circuit; 21, 23 phase detector; 22 storage; 24 switch controller; 100, 101 power supply system.

The invention claimed is:

1. A power supply system, comprising:
    an uninterruptable power-supply apparatus supplying power to a load, said uninterruptable power-supply apparatus including a converter converting an AC input power into a DC power and an inverter converting said DC power into an AC output power to supply said AC output power to said load;
    a first switch connecting a bypass power supply to said load; and
    a switching circuit turning said first switch on when said uninterruptable power-supply apparatus is stopped, wherein
    in a case where said uninterruptable power-supply apparatus is stopped due to a failure of said inverter, said switching circuit turns said first switch on when a phase of an output voltage of said bypass power supply is equal to a phase of an output voltage of said uninterruptable power-supply apparatus at a stopped timing, and
    wherein the switching circuit turns on said first switch at approximately the same time as when said uninterruptable power-supply apparatus is stopped, and the bypass power supply is an AC voltage supply,
    wherein said switching circuit includes
    a first phase detector detecting a phase of an output voltage of said uninterruptable power-supply apparatus,
    a storage storing the phase of the output voltage at a stopped timing of said uninterruptable power-supply apparatus,
    a second phase detector detecting a phase of an output voltage of said bypass power-supply, and
    a switch controller,
    wherein said switch controller compares the phase of the output voltage of said uninterruptable power-switch apparatus stored in said storage with the phase of the output voltage of said bypass power-supply detected by said second phase detector, and turns on said first switch when the phase of the output voltage of said bypass power-supply matches with the phase of the output voltage of said uninterruptable power-supply apparatus, and
    wherein said switch controller periodically acquires a value of the phase of the output voltage stored in said storage, and determines, based thereon, whether said uninterruptable power-supply apparatus is operated or stopped.

2. The power supply system according to claim 1, wherein said uninterruptable power-supply apparatus includes:
    a synchronizing circuit for synchronizing an output voltage of said uninterruptable power-supply apparatus with an output voltage of said bypass power supply.

3. The power supply system according to claim 2, wherein said uninterruptable power-supply apparatus further includes:
a second switch separating said uninterruptable power-supply apparatus from said load when said uninterruptable power-supply apparatus is stopped, and
after said uninterruptable power-supply apparatus is recovered, when a phase of an output voltage of said uninterruptable power-supply apparatus is synchronized with a phase of a voltage of said bypass power supply, said switching circuit turns said first switch off and turns said second switch on.

* * * * *